Nov. 20, 1934.　　T. J. DONOVAN, JR　　1,981,724
ADJUSTABLE DISPLAY STRUCTURE
Filed May 12, 1933　　9 Sheets-Sheet 1
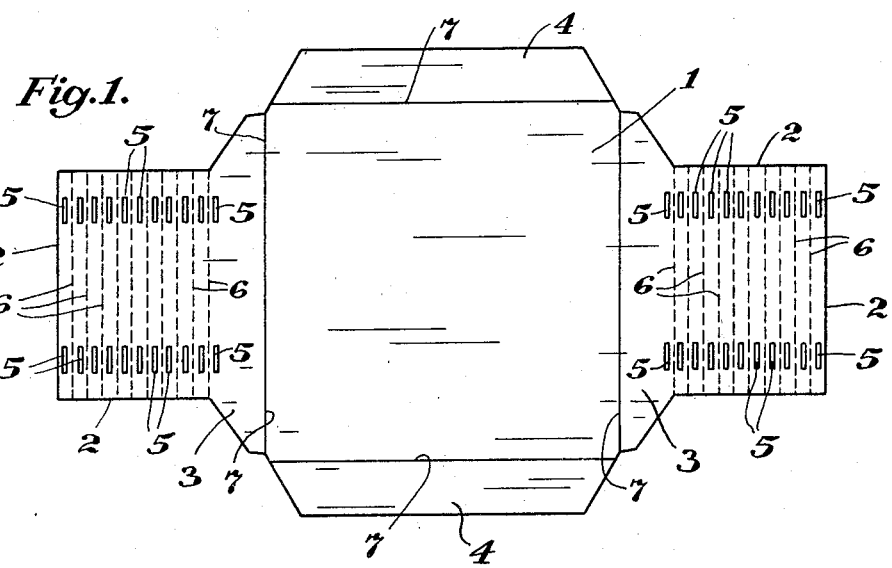
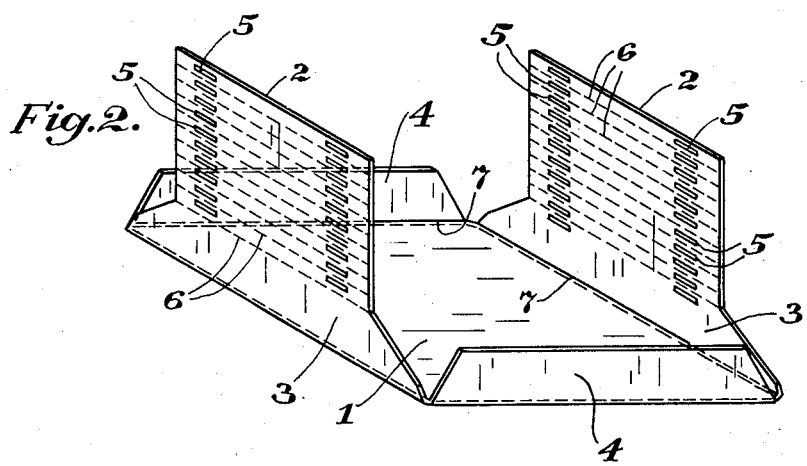
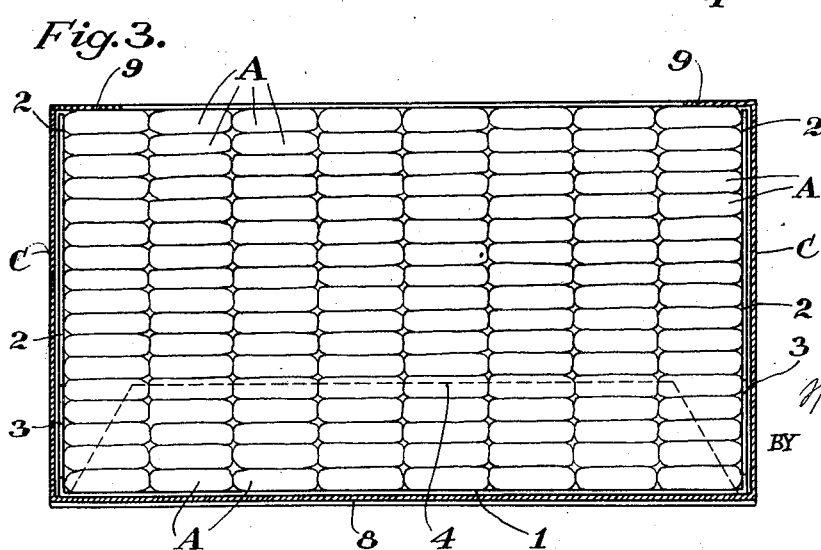
INVENTOR.
Thomas J. Donovan Jr
BY
Cornelius D. Ehret
his ATTORNEY.

Nov. 20, 1934.  T. J. DONOVAN, JR  1,981,724
ADJUSTABLE DISPLAY STRUCTURE
Filed May 12, 1933   9 Sheets-Sheet 2
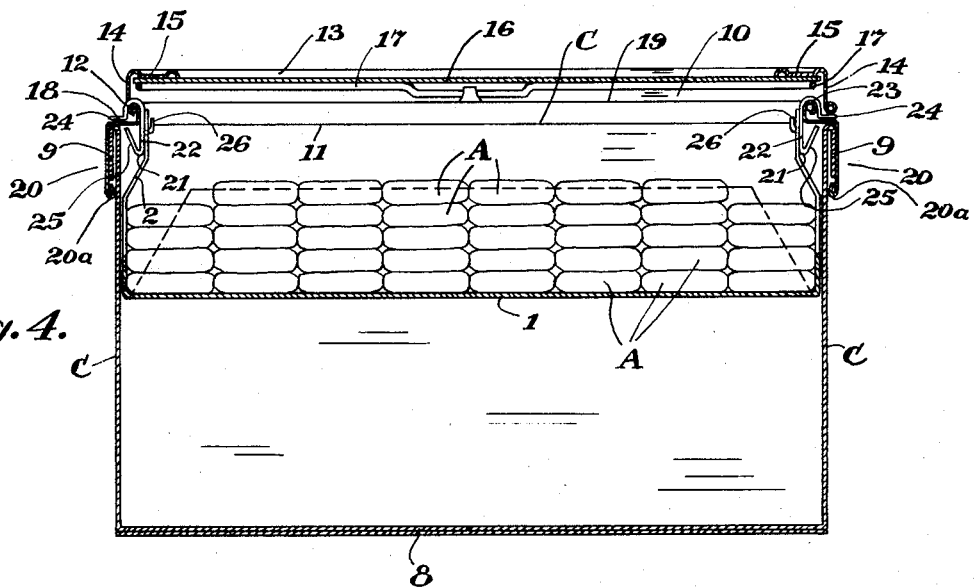
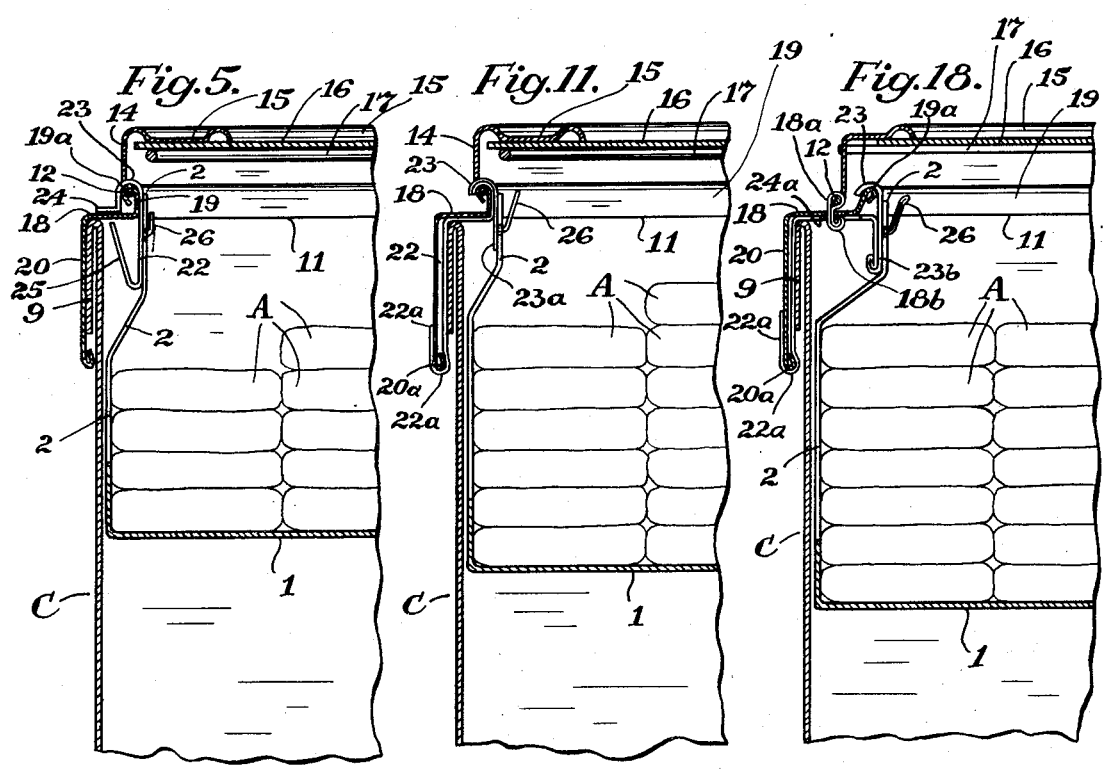
INVENTOR.
Thomas J. Donovan Jr
BY Cornelius L. Ehret
his ATTORNEY.

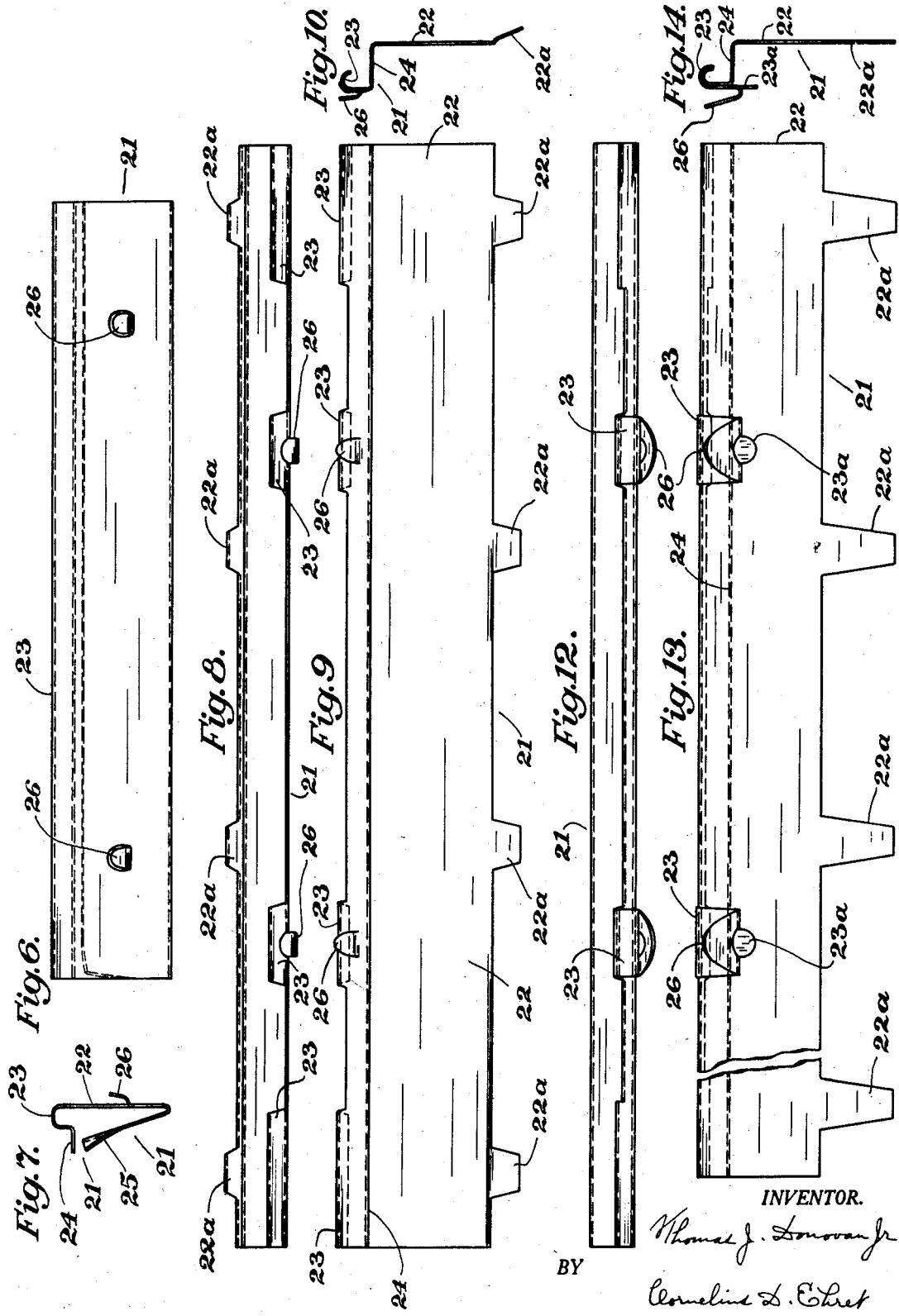

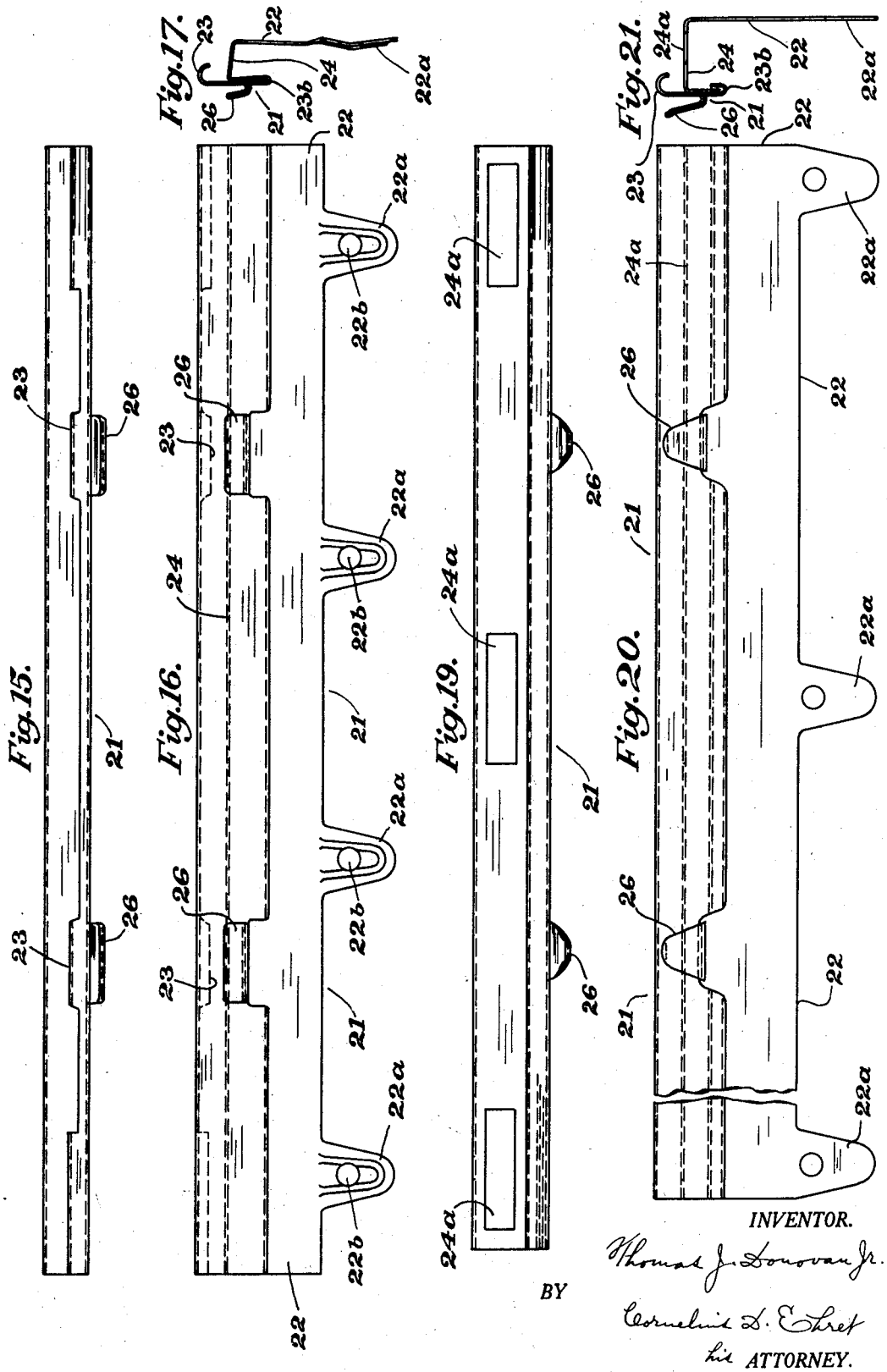

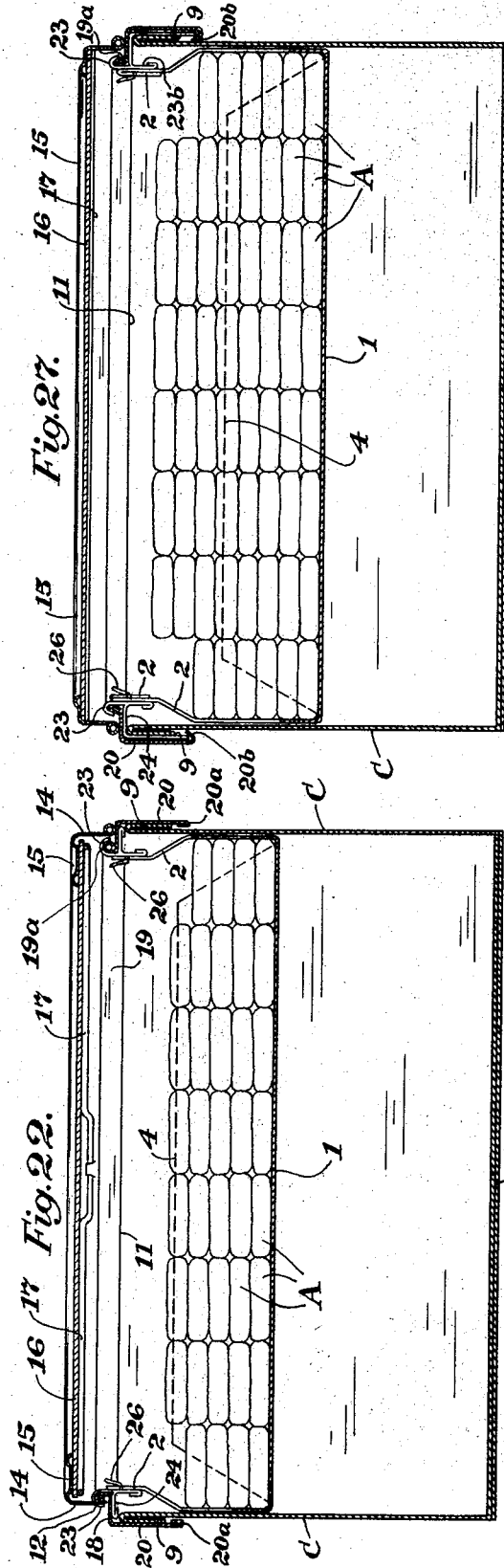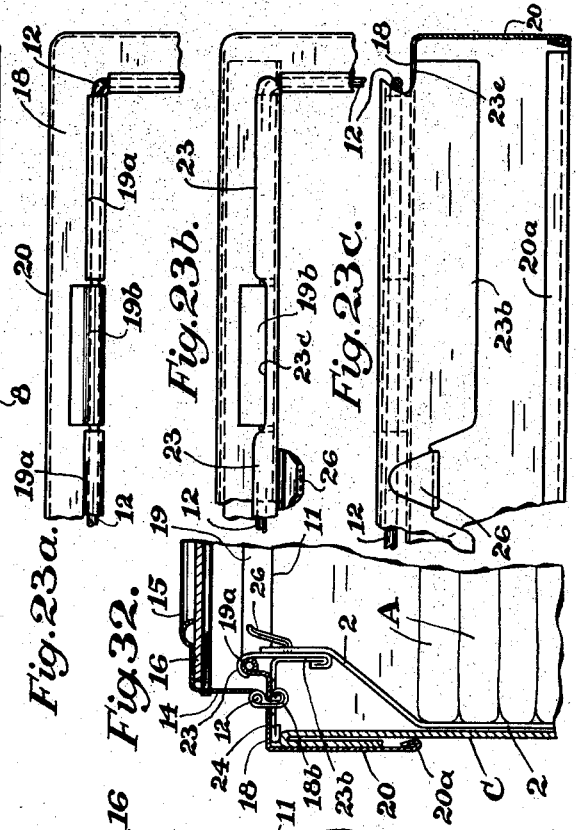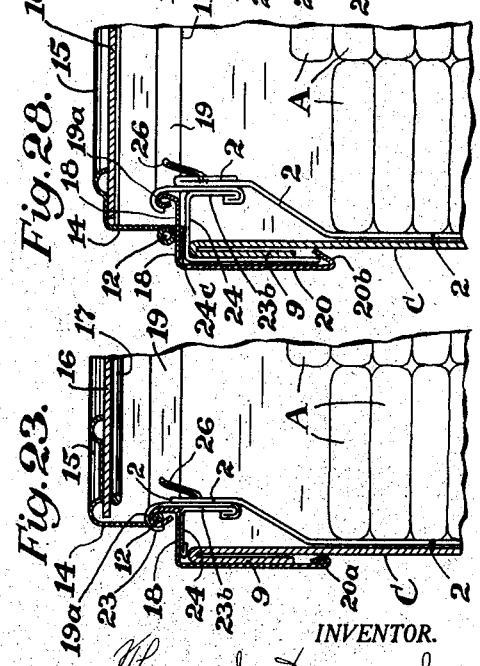

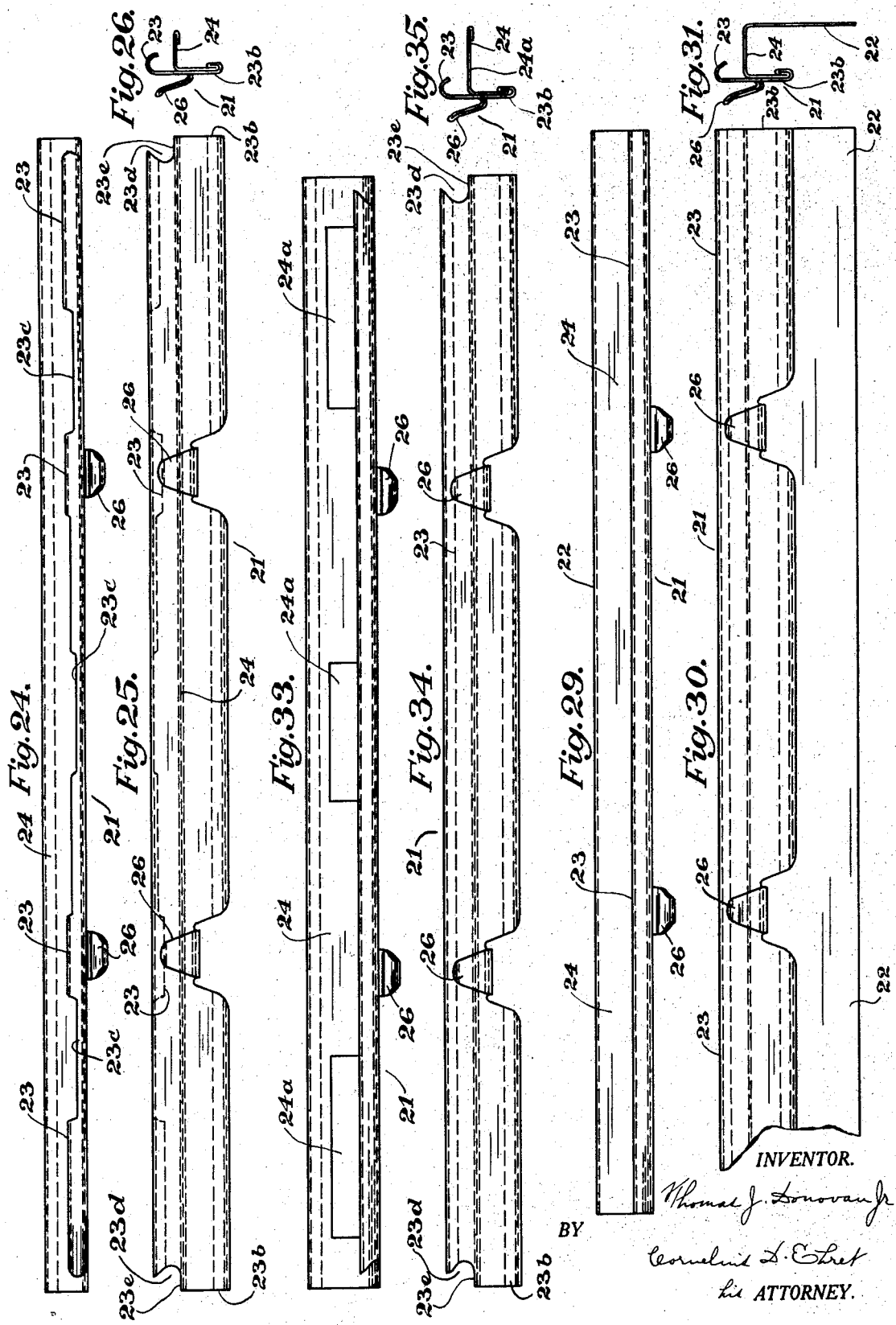

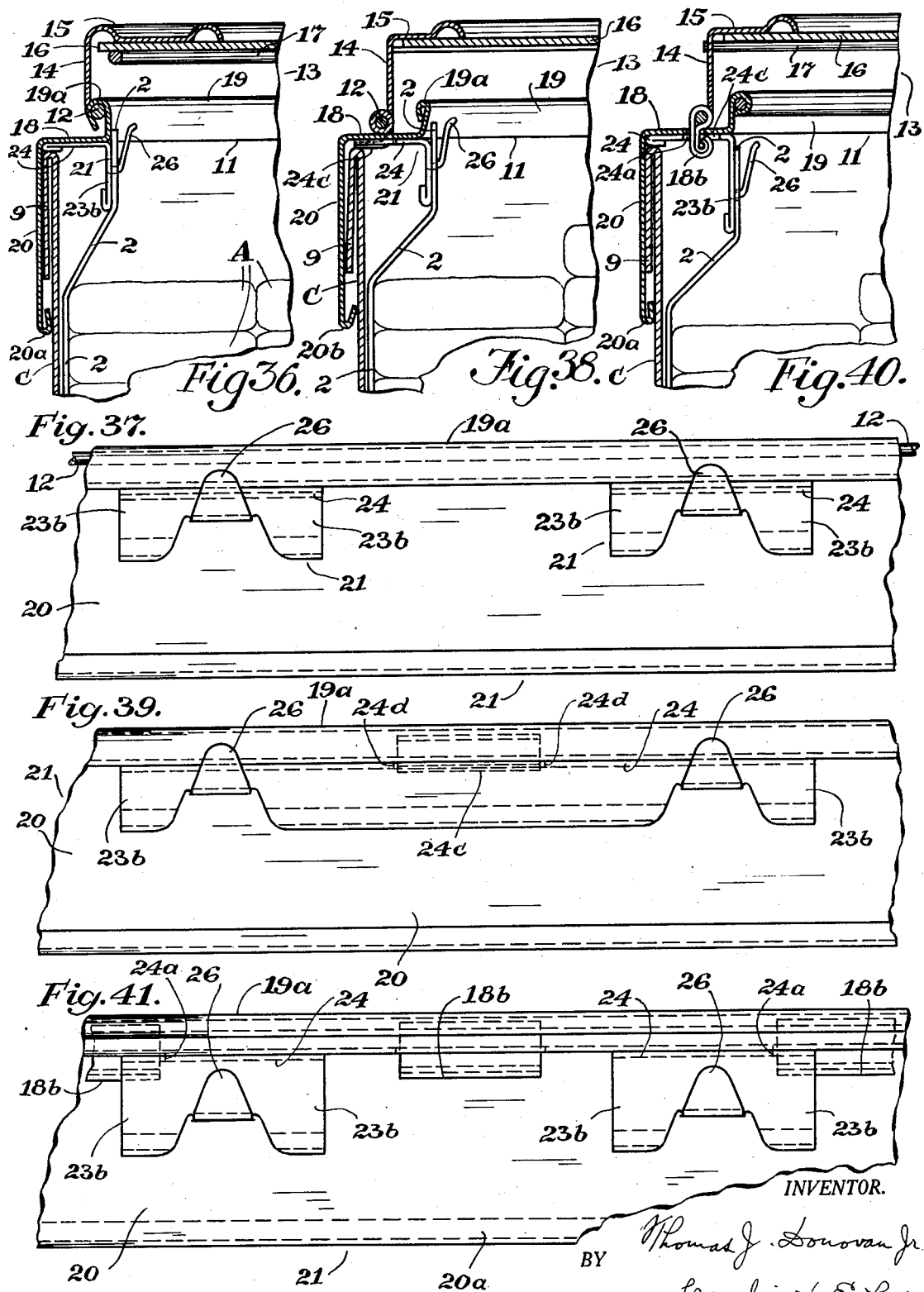

Nov. 20, 1934. T. J. DONOVAN, JR 1,981,724
ADJUSTABLE DISPLAY STRUCTURE
Filed May 12, 1933 9 Sheets-Sheet 8
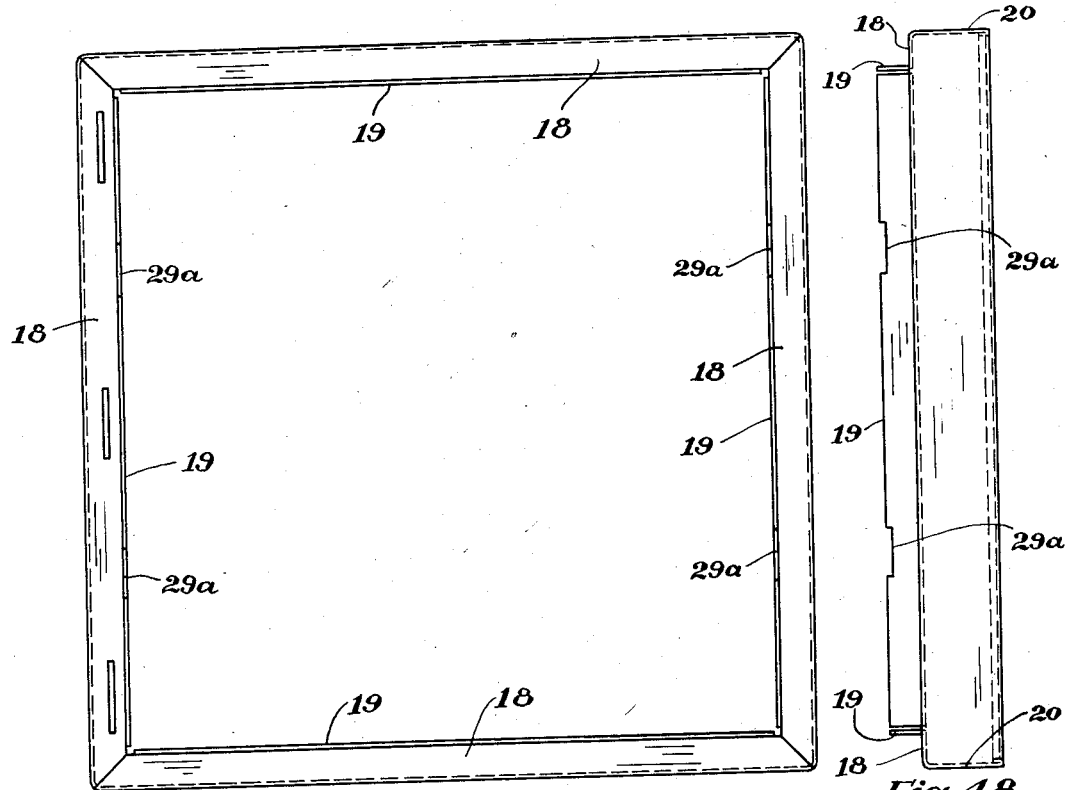
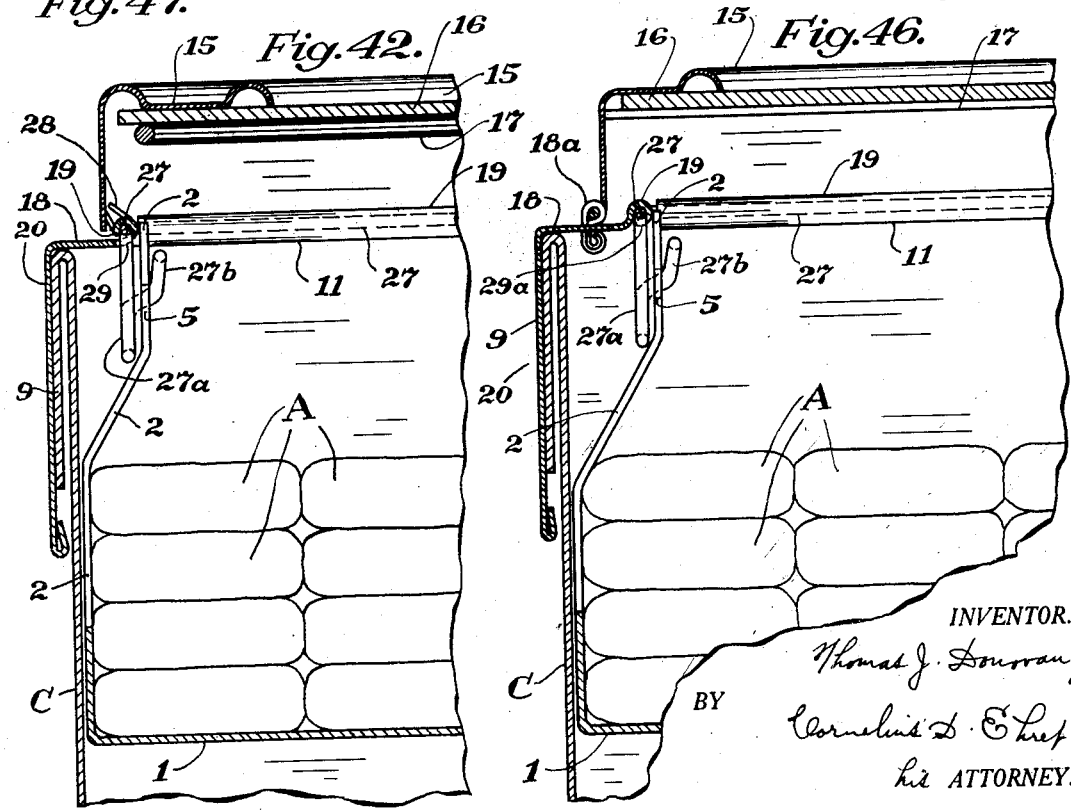

Nov. 20, 1934.  T. J. DONOVAN, JR  1,981,724
ADJUSTABLE DISPLAY STRUCTURE
Filed May 12, 1933   9 Sheets-Sheet 9
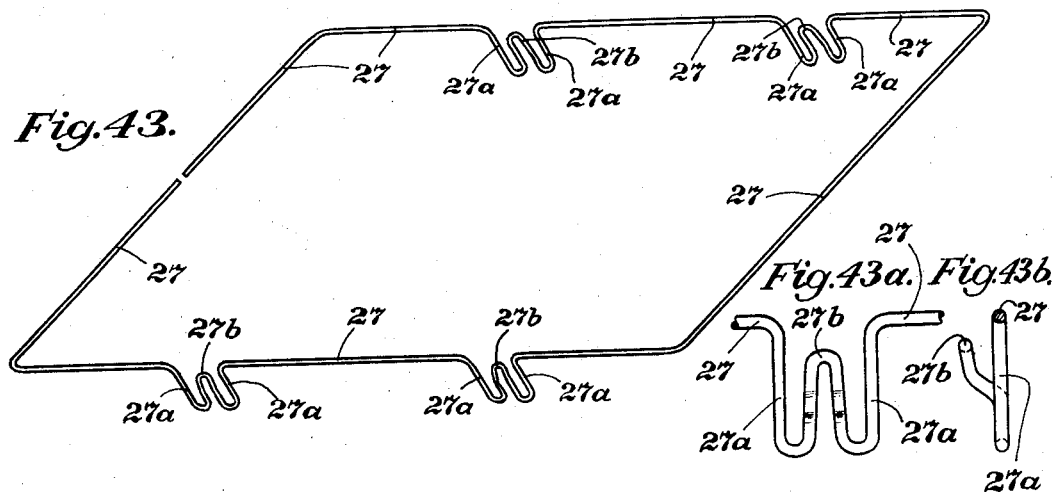
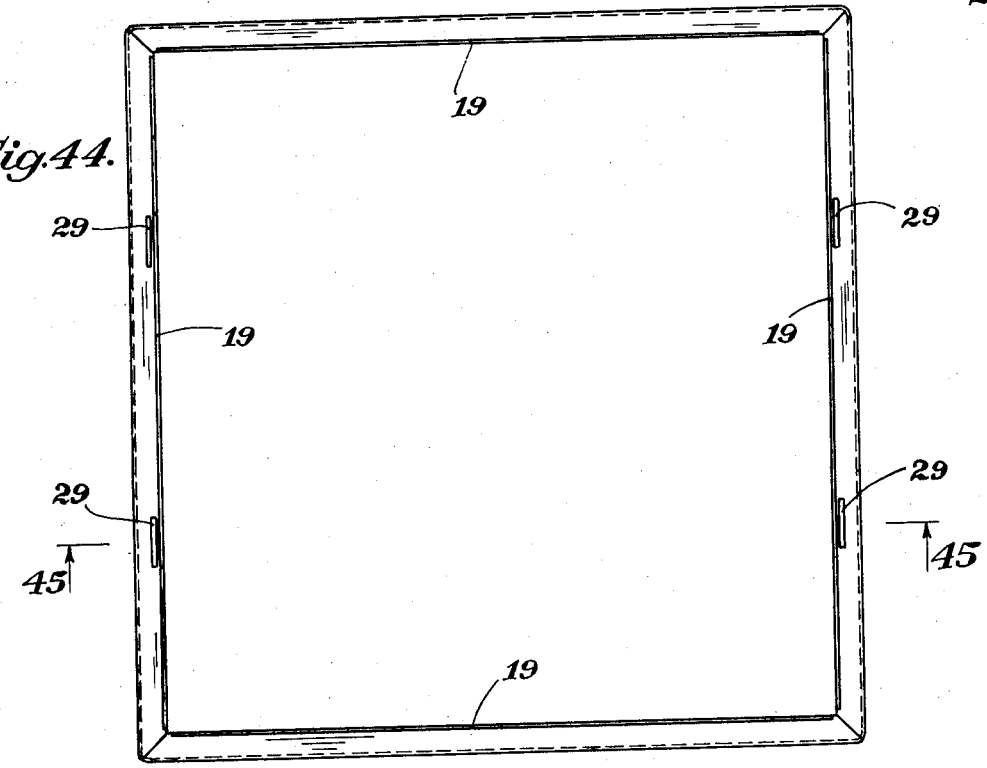
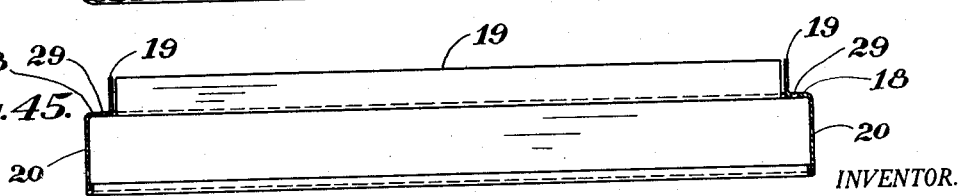
INVENTOR.
Thomas J. Donovan Jr
BY
Cornelius L. Ehret
his ATTORNEY.

Patented Nov. 20, 1934

1,981,724

UNITED STATES PATENT OFFICE 1,981,724

ADJUSTABLE DISPLAY STRUCTURE

Thomas J. Donovan, Jr., Philadelphia, Pa., assignor to J. S. Ivins' Son, Inc., Philadelphia, Pa., a corporation of Delaware Application May 12, 1933, Serial No. 670,693

23 Claims. (Cl. 206—44)

My invention relates to structure for displaying articles or goods of any character, more particularly food stuffs, such as biscuits, cake and the like, and more particularly to display structure comprising a tray or false bottom of a container, such as a caddie, que or the like, in combination with means for detachably adjustably supporting it upon a cover structure adapted for detachable mounting upon a plurality of containers interchangeably or in succession.

In accordance with my invention, a false bottom or tray of a container for goods or articles packed or disposed upon the false bottom or tray, is provided with flaps or equivalent members having suitable structural characteristics, such as support-receiving apertures or equivalent construction, for detachably supporting the tray or false bottom independently of the container, in successively higher positions as the stock of articles or goods is progressively depleted, upon supporting members permanently comprised in or detachably secured to the cover structure; more particularly the structure of the flaps and supporting members is preferably such that the tray or false bottom, with its load, is positively supported in each of its positions to which successively elevated, without possibility of slippage or displacement; and more particularly the supporting members may comprise, or be provided with, hook-like or equivalent elements extending through apertures in the tray flaps, whereby the tray or false bottom with the goods or articles thereon hangs from such elements.

My invention resides in adjustable display structure having various features of arrangement, construction, and combination of the character hereinafter described and claimed.

For an illustration of some of the various forms my structure may take, reference is to be had to the accompanying drawings, in which:

Fig. 1 is a plan view of one form of tray or false bottom utilizable in my structure.

Fig. 2 is a perspective view of the same, with flaps upstanding in position for use.

Fig. 3 is a vertical sectional view, partly in elevation, illustrating the tray in initial position in a container filled with articles.

Fig. 4 is a vertical sectional view, parts in elevation, of a container with separate and detachable cover provided with one form of tray support.

Fig. 5 is an enlarged sectional view of a portion of Fig. 4.

Figs. 6 and 7 are, respectively, side and end elevational views of the supporting member included in Figs. 4 and 5.

Figs. 8, 9, and 10 are, respectively, top plan, side elevational, and end elevational views of a modified form of supporting member.

Fig. 11 is an enlarged sectional view illustrating a modification.

Figs. 12, 13, and 14 are, respectively, top plan, side elevational, and end views of the supporting member included in Fig. 11.

Figs. 15, 16 and 17 are, respectively, top plan, side elevational, and end elevational views of a modified form of supporting member.

Fig. 18 is an enlarged sectional view of a further modification.

Figs. 19, 20 and 21 are, respectively, top plan, side elevational, and end elevational views of the supporting strip included in Fig. 18.

Fig. 22 is a vertical sectional view of a further modification.

Fig. 23 is an enlarged sectional view of the structure shown in Fig. 22.

Fig. 23a is a fragmentary top plan view of a part of the cover structure of Figs. 22 and 23.

Fig. 23b is a top plan view of the structure of Fig. 23a having applied thereto the supporting member of Figs. 22 and 23.

Fig. 23c is a side elevational view, partly in section, of the structure illustrated in Fig. 23b.

Figs. 24, 25, and 26 are, respectively, top plan, side elevational, and end elevational views of the supporting member embodied in Figs. 22 and 23.

Fig. 27 is a vertical sectional view of a further modification.

Fig. 28 is an enlarged sectional view of part of Fig. 27.

Figs. 29, 30 and 31 are, respectively, top plan, side elevational, and end elevational views of a form of supporting member employed in the structures of Figs. 27 and 28.

Fig. 32 is an enlarged sectional view of a further modification of cover with associated supporting member of different form.

Figs. 33, 34 and 35 are, respectively, top plan, side elevational, and end elevational views of the supporting member employed in the structure of Fig. 32.

Figs. 36 and 37 are respectively sectional and elevational views of cover structure having built-in or permanently included structure for supporting trays or false bottoms independently of the containers.

Figs. 38, 39 and Figs. 40, 41 are sectional and elevational views of modifications of built-in tray supporting structures, Fig. 42 is a sectional view, parts in elevation, of a container whose cover structure is provided with a built-in tray-supporting structure comprising a bead-wire or hinge-wire having elements received in apertures in the tray flaps.

Figs. 43, 43a and 43b are, respectively, perspective, and enlarged fragmentary front and side elevational views of the wire supporting structure of Fig. 42.

Figs. 44 and 45 are respectively plan and vertical sectional views of the cover frame of Fig. 42, before application of the wire supporting structure.

Fig. 46 is a sectional view, parts in elevation, of a modification of the structure of Fig. 42, in which the wire supporting structure is associated with a cover frame of different type.

Figs. 47 and 48 are, respectively, plan and side elevational views, of the cover frame before application of the wire supporting structure.

In Figs. 1 and 2 there is shown an example of various forms of false bottoms or trays utilizable in accordance with my invention. The bottom 1 of the tray, or false bottom, is provided with flaps 2, or any equivalent lifting and bottom supporting members. At their ends adjacent the bottom 1 they may be broadened out in the portions 3 to substantially the full length of the side of the bottom 1 so constituting, when in the vertical position shown in Figs. 2 and 3, members for stiffening the bottom 1 which at its opposite ends may be provided with like stiffening elements or flaps 4.

The flaps 2, in the example illustrated, are provided with apertures 5, of any shape or configuration such as circular, elliptical, or otherwise suited to the form and dimensions of the elements received therein, as hereinafter described, for supporting the member 1. In the example illustrated the slots 5 are rectangular to suit the lugs or hook-like elements upon which the tray or member 1 is hung upon the cover structure of the container, independently of the container itself.

Along the lines 6, between neighboring perforations 5 the flaps 2 are scored, perforated, or otherwise weakened, to facilitate tearing off of the upper ends of the flaps as the bottom is elevated to its successive positions. When perforated along the lines 6, the perforations may be circular or of the so-called "flat" or rectangular type.

In the example illustrated, the tray structure is formed from a single sheet of cardboard, pasteboard, or other suitable material, with the flaps 2 and members 4 integral with the bottom or tray element 1. The blank is preferably scored along the lines 7 to permit ready bending of the flaps 2 and members 4 into upwardly extending positions indicated in Fig. 2.

It shall be understood however, that the bottom member 1 may be of any suitable material, rigid or otherwise, and that the flaps 2 may be separate therefrom but attached thereto, and the flaps 2 may be formed in a single piece extending across the under side of the member 1 and may be suitably attached thereto.

In Fig. 3 there is shown a container C, such as a caddie or que, of cardboard, strawboard, pasteboard, or the like, with the tray structure, of the type illustrated in Fig. 2, disposed therein, with the tray member 1 upon the bottom 8 of the container and the flaps 2 extending upwardly adjacent the sides of the container. Upon the tray structure and within the container are disposed the goods or articles A, for example biscuits, cakes, or other articles of food, either haphazard or in bulk, or, as indicated, with substantial regularity. The container C may have at its upper end along its four top edges the inwardly turned flanges or flaps 9.

The structure and its contents as illustrated in Fig. 3 constitutes a package or unit shipped to store keepers who place the goods upon display and dispose of them in successive lots by removing the articles A from the top of the container through the detachable cover structure. As the goods within the container are reduced in quantity or depleted by successive sales, the flaps 2 are lifted to bring the top of the remaining goods substantially to the top of the container C, and for this purpose there is employed structure, including the tray, constituting my invention.

In Figs. 4 and 5 the aforesaid package or unit is shown in section, with the bottom or tray member 1 in elevated position to correspond with depletion of previously sold stock.

The aforementioned flanges or flaps 9 are shown bent downwardly and outwardly, parallel with the walls of the container C. Upon the container is detachably mounted the cover structure 10 comprising the cover frame 11, generally of sheet metal, upon which there is hinged at 12 the cover proper 13 having the vertical walls 14 and inwardly extending horizontal elements 15 constituting a border for an opening covered by the sheet of glass 16 held by the retaining member 17. The cover frame 11, generally of sheet metal, comprises the horizontal member 18, forming a border around an opening above the articles A for access thereto. Rising from the member 18 is the upwardly extending flange 19 having bead 19a embracing wire or rod 12 which extends around the four sides of the cover frame; and depending from the member 18 is the skirt or flange member 20, preferably covering the flange or flap 9 of the carton or container C.

For supporting the tray or false bottom there are provided on opposite sides of the cover frame 11 the supporting members 21, preferably of sheet metal, and detachably secured upon the cover frame 11, or permanently comprised therein. The supporting member 21, shown on enlarged scale in Figs. 6 and 7, comprises the vertically extending portion 22 bent over at its top at 23 to form suitable hook means for embracing the bead 19a of the cover frame 11, and terminating in the horizontal flange element 24 adapted to lie upon or adjacent the horizontal member 18 of the cover frame 11. At its lower end the plate or portion 22 is bent upwardly and outwardly to constitute the element 25 to impart to the supporting member 21 as a whole beam or girder-like structure of suitable stiffness and strength. Secured upon or struck up from the plate portion 22 are the tray supporting elements 26 generically illustrating tray-supporting elements either received in the aforesaid apertures 5 of the flaps 2 of the tray structure or otherwise coacting with the tray to support it. In the example illustrated the elements 26 are hook-like members upon which the flaps 2 of the tray are hung, thereby hanging the tray and its contents A upon the detachably mounted cover structure, independently of the container C. In structure of this character the tray flaps 2 do not engage the container or any part thereof, but are supported solely by the frame structure of the detachably mounted cover.

Furthermore, the flaps 2 and therefore the tray 1 are positively held in definite position at all times with respect to the cover structure and the support of the tray is not dependent upon frictional or equivalent engagement with the cover or supporting member, and therefore is not subject to displacement by slippage or otherwise.

In Figs. 8, 9 and 10, is shown a modified form of tray support, again preferably of sheet metal and again having an arcuate portion 23 adapted to embrace a bead upon the cover structure, which again may be of the type of that indicated in Figs. 4 and 5. In this instance the hook-like members 26 are disposed near the parts 23, which latter are disposed above the horizontal element 24 from which depends the vertical plate 22 terminating at its lower end in the offset lugs 22a. The parts 24, 22, and 22a may be positioned and utilized as generally indicated for the generally corresponding parts of the supporting member of Fig. 11.

In Fig. 11 the cover structure in general corresponds with that of Figs. 4 and 5. In this case the sheet-metal supporting member 21, shown more fully in Figs. 12-14, has the arcuate portion 23 for attachment to bead 19a; member 23 is double-ply, one ply constituting the downwardly and upwardly extending hook-like members 26, received in the apertures 5 of the flaps 2; from the bend of the hook members 26 is struck up the lug 23a forming a back guide or stop for the flap 2. The horizontal portion 24 extends under the horizontal plate portion 18 of the cover frame 11, above the top of the over-turned edge of the container C. Downwardly extending from the part 24 is a plate member 22 lying between the skirt or flange 20 of the cover frame 11 and the outwardly turned flap or flange 9 of the container. At its lower edge the plate member 22 is provided with the lugs 22a which as shown in Fig. 11 are bent around the lower beaded edge 20a of the skirt 20. In this instance again the perforations 5 of the flaps 2 of the tray are passed over the hook members 26, with the result that the tray is held positively in each of its successive elevated positions.

In Figs. 15, 16 and 17 is illustrated a generally similar sheet-metal supporting member again having elements 23 adapted to embrace a bead such as 19a or other suitable portion of any suitable type of cover structure detachably mounted upon the container. Extending below the element 23 is the flattened loop 23b serving generally the purposes of the lug 23a of Figs. 12-14; the hook or supporting element 26 again points in opposite direction from the bead embracing element 23, and is struck up from a portion of the metal adjacent the part 24 from which depends the flange or skirt 22 from the lower edge of which extend the lugs or parts 22a having the holes or perforations 22b for weakening lugs 22a to facilitate bending them around the lower end of a cover-frame element such as 20, Fig. 11.

In Fig. 18 the cover structure is of somewhat different form in that through the horizontal flange 18 of the cover frame extend several hinge-holding members 18a, spaced from each other along the hinge 12. The member 18 embraces the hinge wire or rod 12, which, as in the other forms of cover illustrated, extends around the four sides of the cover frame; member 18 at its lower end is bent into a member 18b for effectively holding the hinge member 12 in suitable position with respect to the cover frame 11. The holder member 21 in this case is generally similar to that shown in Figs. 12-14, and comprises the member 23 which grasps or embraces the bead 19a at the upper edge of the part 19 of the cover frame 11. The bead 19a is spaced inwardly from the outer wall 14 of the cover and is a continuation of the horizontal plate 18 of the cover frame. Below the part 23 the holder member has the downwardly extending flange 23b, serving as a backing or guide for the upper ends of the flaps 2 through whose perforations 5 extend the hook members 26. In this case the horizontally extending portion 24, disposed under plate 18 and above the upper edge of the container is provided with slots or cut-outs 24a to clear the hinge members 18b. From the plate 24 extends downwardly the skirt or plate 22, disposed inside of the flange 20 of the cover frame between it and the outwardly turned flap 9 of the carton C. The member 22 again terminates in lugs 22a, which are bent around the bead 20a at the lower edge of the flange 20 of the cover frame.

In Figs. 22 and 23 the cover structure is of substantially the type illustrated in Fig. 4; in this instance the holder member 21, shown more in detail in Figs. 24-26, is of a specifically different form, comprising again the member 23 for embracing the cover frame bead 19a. Extending in opposite direction are the hook members 26 below which extends the member 23b beaded or turned over at its lower end; there is provided also the horizontally extending member 24, beaded or turned over at its end, and lying beneath and against the horizontal flange 18 of the cover frame. The skirt or flange 20 of the cover frame passes over the flap 9 of the doubled over edge of the container C. The member 24, as in the case of other supporting members herein described, though extending adjacent or beyond the upper edge of the container, does not cooperatively engage it or any part of the container. In the present instance, the member 24 serves to abut against the lower side of the flange 18, to hold the member 21 in substantially upright position notwithstanding the weight of the tray and its contents hanging upon the hook members 26.

In Figs. 23a–23c, there are shown fragments of the cover frame and thereto attached cover member. The wire or rod 12, which extends around the four sides of the cover frame above and near one edge of the cover frame plate 18 serves, as in other modifications having this type of cover structure, also as the hinge along one side of the cover frame. It is held in the beads 19a and at suitable points between them is embraced by hinge elements 19b at the lower edge of the flanges 14 of the cover proper. As shown in Fig. 23b and Fig. 24, the bead embracing member 23 is cut away at 23c to clear the members 19b. As indicated in Figs. 23c and 25, the holder member 21 at the ends of its upper portion are recessed as indicated at 23d to engage or embrace the rod or wire 12, while the adjacent edges 23c engage under the horizontal flange plate 18 of the cover frame 11.

In Figs. 27 and 28 is shown another type of cover structure with a modified form of supporting member suited thereto. In this instance the horizontal flange 18 of the cover frame extends inside the cover flange 14, hinged at 12, and terminates in the bead 19a of the frame member 19. The cover frame has the downwardly extending skirt or plate 20 terminating in the upwardly turned hook 20b which engages the sides of the container or que C, the more securely to hold the cover structure detachably upon the container. The holder member, shown in greater detail in Figs. 29–31, comprises in addition to the aforementioned member 23 attached to bead 19a, the downwardly extending double-ply shank or part 23b whose end is bent back upon itself, and serves as a backing or guide for the flaps 2 of the tray 1. There is struck up from the shank or skirt 23b the hook members 26. It is again provided that the horizontal element or part 24 which extends, free of the folded over edge of the container C, shall lie against the under side of the cover frame. Depending from the member 24 is the flange or skirt plate 22 passing between the turned over flange or flap 9 of the container and the inside of the skirt plate 20 of the cover structure. In this instance the flaps 2, instead of removal, by tearing off along the scoring 6, of the excess projecting above the hook members 26, when the tray is elevated to a new position, is doubled back upon itself, bringing two neighboring perforations 5 into register, so that the flap 2 is of double thickness where it engages the hooks upon the members 26. It will be understood that so arranging the upper end of the flap members 2 in double thickness may be resorted to in any of the other arrangements herein disclosed.

In Fig. 32 the cover structure is again of a type similar to that shown in Fig. 18, and the holder member, in general similar to that illustrated in Figs. 19–21, is specifically shown in Figs. 33–35. The holder member in this instance comprises again the bead embracing part 23, hook members 26, depending member 23b, and horizontal laterally projecting member 24 again having the cutouts 24a to clear the hinge structure 18b. In this instance the downwardly extending skirt or flange 22 and lugs 22a, of the form shown in Fig. 21, are omitted. The horizontal arm 24 lies under and against the horizontal flange 18 of the cover frame, and is free of the upper edge on all parts of the container C; member 24a so engaging the under side of member 18 serves to maintain the holder member in erect position notwithstanding the tendency to rotate about the bead 19a due to the weight of the tray and its contents.

The holder members 21 hereinbefore described are particularly suited for attachment to previously made and existing covers of various types, for detachable application thereto. It shall be understood, however, that some aspects of my invention are embodied in cover structures where hook members 26 or equivalent means are provided as a permanent part of the cover structure for holding the flaps of the tray or false bottom. This aspect of my invention is illustrated in Figs. 36–48.

In Figs. 36 and 37, the cover structure is generally similar to that shown in Fig. 23. The supporting member 21, permanently a part of the cover frame structure, comprises the flange or plate 24, spot-welded or otherwise permanently attached to the under side of the flange 18 of the cover frame 11. Secured to or integral with the element 27 is the hook member 26 or any other equivalent element carried by and suitably projecting from the supporting member 21, to enter the apertures 5 of the flaps 2 of the tray structure. Depending vertically from the flange or plate 24 are the guide or back stop elements 23b laterally engaging the flap 2 which presses against it.

In Figs. 38 and 39 the cover structure is of the character indicated in Fig. 28. The supporting member 21 is permanently built into the cover structure as by spot-welding its lateral plate or flange 24 to the under side of the cover flange 18. In this case the flange 24 is cut away at 24d, to accommodate and clear the sheet metal element 24c, a part of the hinge structure for the cover 13. The member 21 is again provided with the hook element 26 or equivalent, and the downwardly extending guide or back stop 23b.

In Figs. 40 and 41, the cover structure is of the type indicated in Fig. 32. The supporting member 21 again comprises, besides elements 23b and 26, a member 24 spot welded or otherwise permanently secured to the cover frame flange 18. The member 24 is notched at 24a at its ends to accommodate and clear the hinge structure element 18b.

In the structure shown in Figs. 34–41 inclusive, since the supporting member 21 is permanently built into or is a permanent part of the cover structure, the lateral flanges or plates 24 may be long enough actually to rest upon the upper edges of the container C, as distinguished from the cases where the supporting member is detachably secured to the cover structure, in which instances the laterally engaging plates or flanges, comparable to the elements 24 of Figs. 36 et seq., may either rest upon or clear the upper end of the container, and in either case the detachable supporting member is otherwise, as by parts 23, attached to the cover structure to support the tray independently of the container.

In Figs. 42 to 48 inclusive there is illustrated a further form of structure, for supporting or holding the tray or false bottom, built-in or permanently comprised in the cover structure for the container.

In Fig. 42, which illustrates a cover structure of the type shown in Figs. 4 and 5, the rod or wire 27, corresponding generally with the wire or rod 12 of Figs. 4 and 5, extends along the sides of the cover frame whose flange 19, upstanding from the horizontal flange 18, is curled or beaded over or around the wire or equivalent element 27. At a plurality of points spaced along one side of the rectangular wire member 27 the cover 15 is hinged to the member 27 as indicated at 28, Fig. 42.

The bead wire 27, shown in perspective in Fig. 43, is bent into downwardly extending loops 27a whose sides are joined by the upwardly extending prong or hook-like members 27b bent out of the plane of loops 27a as indicated in Figs. 42 to 43b inclusive.

The cover frame is shown in Figs. 44 and 45 before application of the bead wire or equivalent member 27. In the horizontal flange member 18 are provided, alongside of the upstanding flange 19, elongated apertures or slots 29 downwardly through which extend the loops 27a when the member 27 is placed upon the horizontal flange 18 of the cover structure, in which position the rectangular member 27 is disposed outside of and surrounds the flange 19, which is then rolled or beaded over the member 27 as indicated in Fig. 42. Accordingly the wire 27 and its loops 27a and prongs 27b are permanent parts of or permanently comprised in the cover structure, more particularly of or in the cover frame. As indicated in Fig. 42, the apertures 5 in the flaps 2 are passed over the hooks or prong members 27b thereby supporting the tray 1, positively and without slippage, and independently of the container, in each of the several positions to which it is from time to time elevated as the stock of goods A is depleted.

In Fig. 46 the cover structure is generally of the type illustrated in Fig. 18. In this case again the bead wire or equivalent member 27, such as illustrated in Figs. 43, 43a and 43b, extends along the sides of the upstanding flange 19 of the cover frame, and is permanently comprised therein by curling or bending the flange 19 over and around the wire 27 as indicated in Fig. 46.

In Figs. 47 and 48 the cover frame is shown in plan and side elevation before application of the member or bead wire 27. In this instance the upstanding flange 19 is provided in its edges with cutouts or notches 29a to provide openings, when the flange 19 is in final beaded position, for clearing the loops 27a. As indicated, the rectangular wire member 27, Fig. 43, is placed inside of the upstanding flange 19, Figs. 47 and 48, with the loops 27a in register with notches 29; flange 19 is then curled or beaded inwardly around the side components of the rectangular frame 27 to the position indicated in Fig. 46. There are provided then the downwardly extending loop members 27a having the inwardly offset prongs or hook members 27b which are received in the apertures 5 of the tray flaps 2 with the same purpose and result as in the case in Fig. 42.

In Fig. 42 the wire 27 serves not only as the bead wire but also as a hinge element for the cover 15; while in Fig. 46 the member 27 serves only as the bead wire, and the cover 15 is hinged elsewhere, as at 18a.

The wire 27, or like member, or equivalent, may be permanently secured to the cover frame to constitute a permanent part thereof by soldering, welding or any suitable attaching means without beading or applying a plate or flange of the cover frame on or to member 27 which may be so secured whether or not there be comprised in the cover frame a flange or plate such as 19.

What I claim is:

1. The combination with cover structure, of tray structure including means for elevating and supporting the same, said cover structure and said tray-elevating means including cooperating disengageable members engageable in any one of a plurality of predetermined positions corresponding with different elevated positions of said tray structure.

2. The combination with cover structure, adapted for detachable mounting upon a container, of tray structure including means for elevating and supporting the same, supporting members independent of the container and disposed on said cover structure, and cooperating supporting members disposed on said tray-elevating means, said first and second named supporting members being disengageable and engageable in any one of a plurality of predetermined positions corresponding with different elevated positions of said tray structure.

3. The combination with cover structure, adapted for detachable mounting upon a container, of tray structure including means for supporting the same provided with vertically-spaced apertures, and tray-supporting means operatively associated with said cover structure and adapted to enter apertures in said first-named means for holding said tray-elevating means independently of the container in any one of a plurality of positions corresponding with different elevated positions of said tray structure.

4. The combination with cover structure, comprising a cover frame adapted for detachable mounting upon a container, and a cover carried by said frame, of tray structure including means for elevating and supporting the same, supporting members permanently comprised in said cover frame, and cooperating supporting members disposed on said tray-elevating means, said first and second named supporting members being disengageable and engageable independently of the container in any one of a plurality of predetermined positions corresponding with different elevated positions of said tray structure.

5. The combination with cover structure comprising a cover frame adapted for detachable mounting upon a container, and a removable cover upon said frame, of tray structure including means for elevating and supporting the same, supporting members upon said cover frame independent of the container and cooperating supporting members disposed on said tray-elevating means, said first and second named supporting members being disengageable and engageable in any one of a plurality of predetermined positions corresponding with different elevated positions of said tray structure.

6. The combination with cover structure, of tray structure including means for elevating and supporting the same, said elevating means being provided with vertically-spaced apertures, and members, operatively associated with said cover structure, received in said apertures for supporting said tray structure in any one of a plurality of predetermined positions to which it may be elevated.

7. The combination with cover structure, of tray structure including means for elevating and supporting the same, said elevating means being provided with vertically-spaced apertures, and members, operatively associated with said cover structure, received in said apertures for supporting said tray structure in any one of a plurality of positions to which it may be elevated, said elevating means weakened between said apertures for facilitating removal in succession of portions of said elevating means.

8. The combination with cover structure, of tray structure including means for elevating and supporting the same, said elevating means having apertures vertically spaced from each other, and hook-like members, operatively associated with said cover structure, adapted to enter said apertures and thereat support said tray structure.

9. The combination with cover structure, of tray structure including means for elevating and supporting the same, said elevating means having apertures vertically spaced from each other, a supporting member detachably mounted upon said cover structure, and an element carried by and projecting from said supporting member adapted to enter said apertures to support said tray structure in any one of a plurality of positions to which it may be elevated.

10. The combination with cover structure, of tray structure including means for elevating and supporting the same, said elevating means having apertures vertically spaced from each other, a supporting member detachably mounted upon said cover structure, and a hook-like member carried by said supporting member adapted to enter said apertures to support said tray structure in any one of a plurality of positions to which it may be elevated.

11. The combination with cover structure, of tray structure including means for elevating and supporting the same, said elevating means having apertures vertically spaced from each other, a supporting member constituting a built-in part of said cover structure, and an element carried by and projecting from said supporting member adapted to enter said apertures to support said tray structure in any one of a plurality of positions to which it may be elevated.

12. The combination with cover structure, of tray structure including means for elevating and supporting the same, said elevating means having apertures vertically spaced from each other, a supporting member constituting a built-in part of said cover structure, and a hook-like member carried by said supporting member adapted to enter said apertures to support said tray structure in any one of a plurality of positions to which it may be elevated.

13. The combination with cover structure, having a bead, of tray structure including means for elevating and supporting the same, said elevating means having apertures vertically spaced from each other, a supporting member having a part for embracing said bead, and an element on said supporting member adapted to enter said apertures to support said tray structure in any one of a plurality of positions to which it may be elevated.

14. The combination with cover structure, of tray structure including means for elevating and supporting the same, said elevating means having apertures vertically spaced from each other, an element permanently attached to said cover structure adapted to enter said apertures to support said tray structure in any one of a plurality of positions to which it may be elevated, and a member permanently attached to said closure structure extending below said element laterally to engage said elevating means.

15. The combination with cover structure, having a bead, of tray structure including means for elevating and supporting the same, said elevating means having apertures vertically spaced from each other, a supporting member having a part for embracing said bead, and an element on said supporting member adapted to enter said apertures to support said tray structure in any one of a plurality of positions to which it may be elevated, and a part of said supporting member extending below said element laterally to engage said elevating means.

16. The combination with cover structure having a flange adapted to extend across the end of a container, of tray structure including means for elevating and supporting the same, said elevating means being provided with vertically-spaced apertures, a supporting member, operatively associated with said cover structure, said supporting member comprising a part abutting against said flange, and an element of said supporting member adapted to engage in said apertures to support said tray structure in any one of a plurality of positions to which it may be elevated.

17. The combination with cover structure, of a flange thereon adapted to extend across the end of a container, a plate depending from the outer edge of said flange, a tray structure including means for elevating and supporting the same, said elevating means being provided with vertically-spaced perforations, a supporting member detachably secured to said cover structure, an element of said supporting member adapted to enter said perforations to support said tray structure in any one of a plurality of positions to which it may be elevated, and flange elements on said supporting member lying adjacent and parallel, respectively, to said flange and plate of said cover structure.

18. The combination with cover structure, of a flange thereon adapted to extend across the end of a container, a plate depending from the outer edge of said flange, a tray structure including means for elevating and supporting the same, said elevating means being provided with vertically-spaced perforations, a supporting member detachably secured to said cover structure, an element of said supporting member adapted to enter said perforations to support said tray structure in any one of a plurality of positions to which it may be elevated, flange elements on said supporting member lying adjacent and parallel, respectively, to said flange and plate of said cover structure, and a member on said supporting member extending below said tray-supporting element and laterally engaging said elevating means.

19. The combination with a cover frame detachably mountable upon a container, of a tray, means for elevating and supporting the tray, a wire-like member permanently secured to said frame and bordering the opening thereof, supporting members carried by said wire-like member, and cooperating supporting members disposed on said tray-elevating means and engageable with said first-named supporting members in any one of a plurality of predetermined positions.

20. The combination with a cover frame detachably mountable upon a container and having a bead bordering the opening of said frame, of a tray, means for elevating and supporting the tray, a wire-like member embraced by said bead, and means for engaging with said first named means for supporting said tray, in any one of a plurality of positions to which it may be elevated, comprising a portion of said wire-like member projecting laterally therefrom.

21. The combination with a cover frame detachably mountable upon a container and having a bead bordering the opening of said frame, of a tray, means for elevating and supporting the tray including a plurality of vertically-spaced apertures, a wire-like member embraced by said bead, and means for engaging with said first named means for supporting said tray, in any one of a plurality of positions to which it may be elevated, comprising a portion of said wire-like member projecting laterally therefrom, and a member offset from said portion and adapted to be received in an aperture of said first named means.

22. The combination with cover structure detachably mountable upon a container, of a tray, a flap of sheet material for elevating and supporting said tray and having vertically-spaced apertures, and means operatively associated with said cover structure adapted to engage in said apertures of said flap for holding said tray in any one of a plurality of positions to which it may be elevated.

23. The combination with cover structure detachably mountable upon a container, of a tray, a flap of sheet material for elevating and supporting said tray and having vertically-spaced apertures, and means operatively associated with said cover structure adapted to extend into said apertures of said flap in a direction normal to its face for holding said tray in any one of a plurality of positions to which it may be elevated.

THOMAS J. DONOVAN, Jr.